Dec. 25, 1945.  H. D. WILSON  2,391,666
BATTERY FILLING AND VENTING MEANS
Filed April 13, 1942
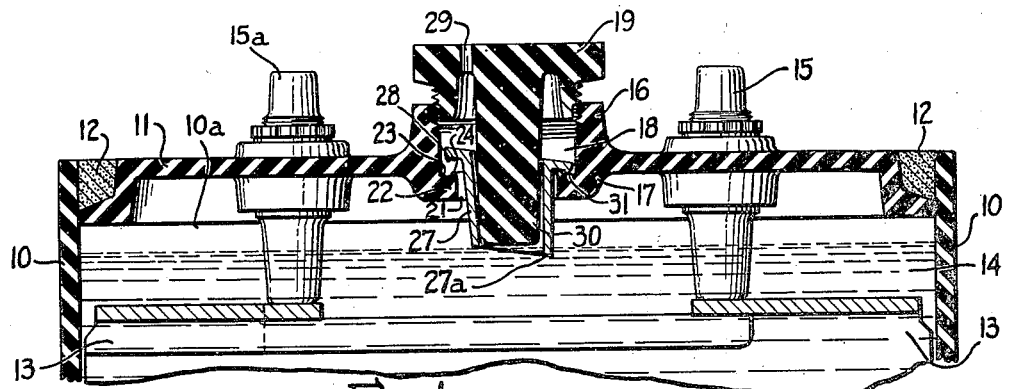
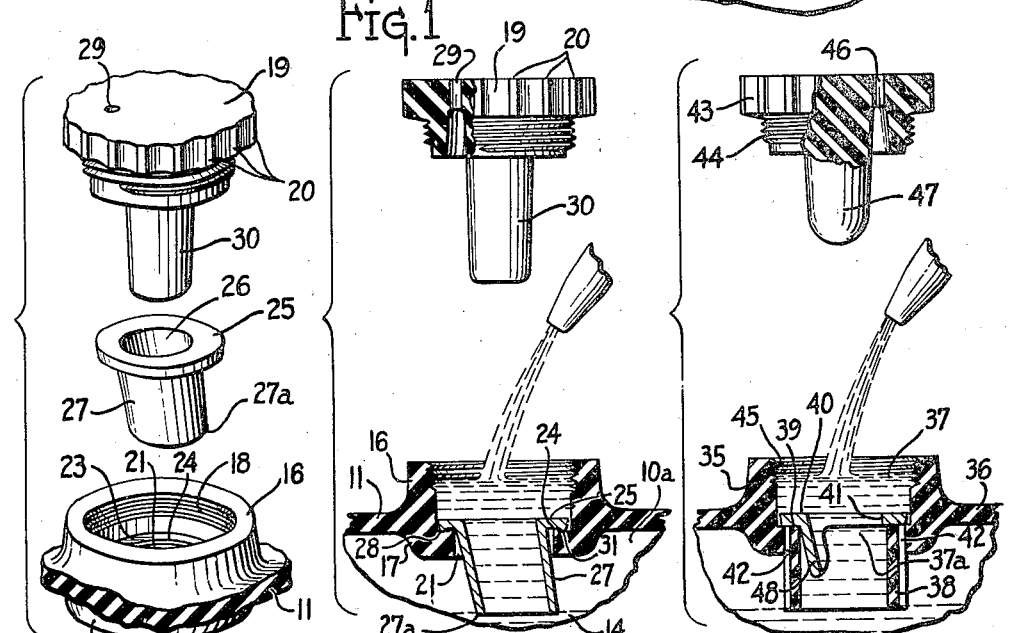
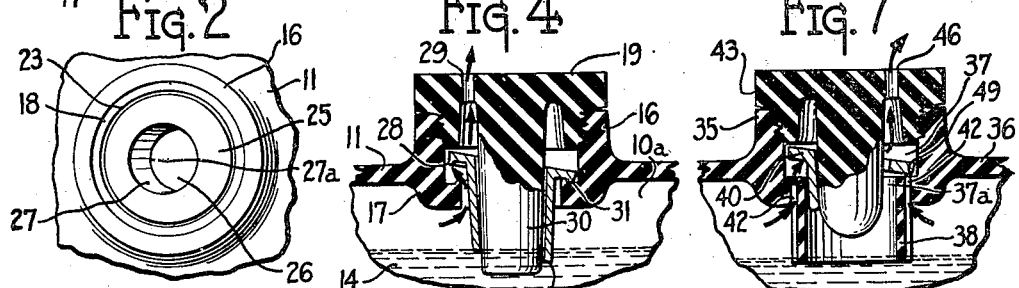
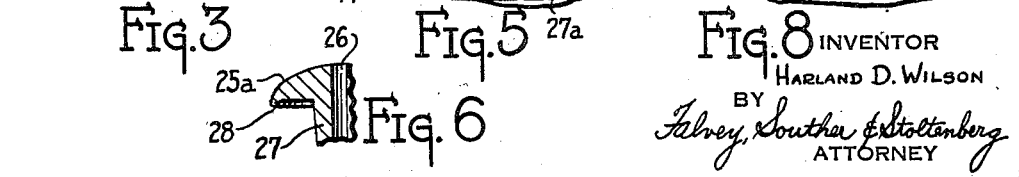
INVENTOR
HARLAND D. WILSON
BY
Falvey, Souther & Stoltenberg
ATTORNEY Patented Dec. 25, 1945

2,391,666

UNITED STATES PATENT OFFICE 2,391,666

BATTERY FILLING AND VENTING MEANS

Harland D. Wilson, Toledo, Ohio

Application April 13, 1942, Serial No. 438,743

13 Claims. (Cl. 136—178)

This invention relates to battery covers with a filling and venting opening, more particularly to a filling and venting means for a battery cover which will determine the level of electrolyte in the battery container during a filling operation.

The art is replete with filling and venting devices for battery covers designed to facilitate the supplying of water to the battery container through a filling aperture to a predetermined level by trapping air in the upper portion of the container. Provision is made in these devices to vent the trapped-air space in the upper part of the container to the atmosphere when the filling aperture is closed, to allow gases generated in the battery electrolyte to escape during the normal operation of the battery. None of these devices, however, has come into general use in the automobile field inasmuch as each has some disadvantage latent in its design which makes it impractical for such general use.

In many of these devices, the designs are difficult to make, which results in a manufacturing cost too high to be justified, or the designs are complicated in structure so that there is constant need for adjustment and the desirable ruggedness is lacking. In still others, resilient materials such as rubber and the like are used which are chemically unstable under the operating conditions in a battery such as the presence of acid, nascent oxygen and other active chemical agents which oxidize or otherwise destroy the resiliency of the material to negative the utility of the devices. In still others, the limits within which the manual control of the venting aperture are actuated are so narrow that a slight disturbance of the closure plug on the filling aperture will block the path of communication by which the venting is accomplished. The generated gases are thereby trapped in the upper portion of the battery container and may cause a rise in the electrolyte level to push the electrolyte out through the filling aperture and then through the closure plug to the outside of the battery container where the electrolyte may be spewed onto surrounding objects. Due to the corrosive action of the electrolyte this must be avoided. In some devices, a quarter turn of the closure plug from tight-closing position is sufficient to cause a closing of the venting communications which makes these devices sensitive to vibration such as found in automobile applications.

The present invention obviates these disadvantages by providing a battery filling and venting means which is simple, rugged, and reliable in operation. It is capable of being manufactured cheaply and is sufficiently durable to last the life of a battery to which it is applied. The present device has the further advantage that the venting of the trapped-air space over the electrolyte is accomplished by positive action of the closure plug under manual manipulation effective over wide limits, whereby the venting communication is maintained even though the closure plug becomes loosened to the extent of disengagement by vibration of the battery. The venting communication of the trapped-air space in the battery container with the atmosphere is maintained until the closure plug is actually being disengaged from the battery cover, which prevents accidental closure or blocking thereof during normal operation of the battery.

The invention has the further advantage in one of its forms of allowing rapid and complete removal of electrolyte used in the forming operation during manufacture of the battery.

It is therefore a principal object of this invention to provide a filling and venting device for the cover of a battery container which is cheap to manufacture, reliable in operation, and durable enough to outlast the life of a battery to which it is applied.

It is a further object of this invention to provide a filling and venting device for the cover of a battery container which will determine the level of the electrolyte in the container during the filling operation by trapping air in the upper portion of the container and which will vent to the atmosphere the upper portion of the container to allow the escape of gases generated in the electrolyte by a simple, insensitive and reliable valve member actuated by a closure cap.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Fig. 1 is a sectional elevation of a battery cell to which the invention has been applied.

Fig. 2 is an exploded view in perspective showing the parts of the invention.

Fig. 3 is a plan view of the filling aperture with the closure plug removed.

Fig. 4 is a sectional elevation with the closure plug removed, showing the position of the valve member during a filling operation.

Fig. 5 is a sectional elevation showing the invention during the normal operation of the battery cell.

Fig. 6 is a sectional elevation of the valve flange of a modification, the section taken at right angles to a plane passing through the fulcrum and the center line of the valve.

Fig. 7 is a sectional elevation of a modification of the invention with the closure plug removed showing the position of the modified valve member during a filling operation; and Fig. 8 is a sectional elevation of the modification during the normal operation of the battery cell.

Referring to the drawing, particularly to Fig. 1, a battery container or enclosure 10 is shown having a cover member 11 positioned in the upper portion thereof, being held in the container 10 by a cement fillet 12 in a manner well known in the art. In the interior of the container 10, battery grid plates 13 are positioned in a corrosive acid electrolyte 14 to make up the well-known lead-acid type battery. A pair of terminals 15 and 15a are provided to project upwardly through apertures in the cover member 11 being connected to the plates 13 and positioned in spaced relation for convenience in making external connections to extraneous electrical circuits.

For long-continued operation of a battery of this type, it is essential that the level of the electrolyte 14 in the container 10 shall be maintained within predetermined limits and provision is made in the upper portion of the container for the replenishment of the electrolyte by the addition of water to the battery when the level of the electrolyte is below the lower limit. It is to this filling means which this invention particularly relates as will be set forth in detail hereinafter.

In some devices the valve member and the depending tubular portion are made unitary, with the venting communication being effected by a small annular gap between the depending tubular portion and an inwardly extending flange on the cover. The usual method of opening the venting communication involves tipping the valve member by a cooperative relation between the valve member and the closure member, the valve being tipped over a fulcrum by the longitudinal movement of the closure member when the closure member is screwed into tight-closed position by manual manipulation. The actual tipping of the valve usually occurs during the last quarter turn of the closure member, which is a very narrow margin resulting in a sensitive device critical to operate, and subject to accidental actuation of the valve member caused by the loosening of the closure member by vibration usually attendant with the use of the battery on automobiles. When the valve is operated by the lower edge of the closure member directly engaging the top side of the valve portion, a very small movement of the closure outwardly causes the valve to close completely. In fact, even less than one quarter turn of the closure sufficiently allows the valve to tilt downwardly into sealing position. By providing a depending portion or extension from the valve and a projection from the vented closure to engage and coact with the depending portion, the projection may be moved a considerable distance without the valve tilting to closed position. In fact, these coacting parts may be so dimensioned, it is necessary to completely disengage the closure from the cover plate before the valve fully seats.

Referring again to Fig. 1, a centrally located boss 16 is provided in the cover 11 of the battery, preferably positioned between the terminals 15 and 15a, cooperating with a depending concentric protuberance 17 on the inner side of the cover. The boss 16 is provided with a recess 18 which is threaded adjacent its upper end to position a closure member or plug 19, which may be engaged with and disengaged from the recess by manual manipulation of the threaded relation, hand grips 20 being provided on the periphery of the plug for this purpose. It is usually preferable to design the threaded relation between the recess and the plug in such a manner that the plug must be turned at least two complete revolutions before the plug may be completely engaged with or disengaged from the recess.

The recess 18 is in communication with the interior of the battery container 10 by means of a filling aperture 21 concentric with the recess and of substantially smaller diameter, being defined by an inwardly extending flange 22, which forms a plateau 23 on the floor of the recess. A small upwardly extending ridge 24 rims the filling aperture 21 adjacent the plateau 23 to hold a small amount of liquid covering the plateau for purposes to be set forth hereinafter.

Cooperating with the plateau 23 on the inwardly extending flange 22, a valve member 25 is provided preferably made of relatively heavy, acid-resistant material such as antimonial lead which is annular in shape, being perforated at a central location by an aperture 26 having preferably the same dimension as the internal dimension of an obliquely depending tubular portion 27 preferably integral with the valve member. With reference to the depending tubular portion 27, to be described in further detail hereinafter, the valve member 25 is in the nature of an outwardly extending flange as is clearly shown in the drawing. The perimeter of the valve member 25 is provided with a small downwardly extending rim 28 similar in nature to the upwardly extending rim 24 on the plateau 23 with which it is adapted to cooperate for holding small amounts of water to form an air-tight seat between the valve member 25 and the plateau 23 when the valve member is in flat parallel relation with the plateau such as shown in Fig. 4 of the drawing. When the valve member is in this position it is actuated by gravity only.

By forming an air-tight seat between the valve and the plateau, an air seal is formed which traps air in the upper portion 10a of the battery container between the lower terminus 27a of the depending tubular portion 27 and the cover 11 to determine the level of the electrolyte in the container during a filling operation. It is to be understood that the level can also be determined by an aperture in the wall of the tube at the proper level which may also be in the form of a slot indenting the lower edge of the depending tubular portion 27. The length of the depending tubular portion is controlled by the desired level of the electrolyte in the container of the battery which may vary widely. The point at which the tubular portion 27 terminates as at 27a, predetermines the electrolyte level during a filling operation, illustrated in Fig. 4, where the valve member 25 forms an air-tight seat with the plateau 23, which by trapping air over the electrolyte causes the water to fill the tubular portion 27 and the recess 18 as shown in Fig. 4, so that no further water may be added to the battery.

After the filling operation as illustrated in Fig. 4 is completed, the closure plug 19 must be positioned in the recess 18 to close the filling aperture. When the closure plug is in position, communication must be had between the container and the atmosphere to allow escape of gases generated in the electrolyte by chemical action. A vent 29 is provided in the closure plug 19 to allow the escape of gases from the recess 18 to the atmosphere. The gases to be vented escape from the container through the filling aperture 21 in the annular space between the internally extending flange 22 and the depending tubular portion 27, the tubular portion being of smaller dimension to fit loosely in the filling aperture. This gas escape from the container is possible only when the air-tight seat between the valve member 25 and the plateau 23 is broken as shown in Fig. 5, where the normal position of the filling and venting device is shown, the path of movement of the escaping gases being shown by the arrows. The mechanism for opening the path of communication for the gas will now be described in detail.

As has been pointed out above, the tubular portion 27 which is preferably integral with the valve member 25, is attached to the valve member at a small oblique angle to the vertical axis thereof, as is best illustrated when Figs. 2, 3, and 4 are compared. The obliqueness of the depending tubular portion may be varied to suit the application, but preferably is about a 10° angle with the vertical axis. Referring to Fig. 3 the lower terminus 27a of the tubular portion is displaced to the right, which is clearly shown in cross-section in Fig. 4. Although the diameter of the tubular portions may be uniform, it is advantageous to make the diameter slightly smaller at the lower terminus 27a as compared with the diameter at the upper end adjacent the valve member 25. When the valve and the tubular portion are made integral, a unitary member is formed which is readily dropped into operative position in the recess 18, so that the valve portion 25 overlies the plateau 23 to form an air-tight seal therewith aided by water or other fluids retained by the rims 24 and 28 on these members respectively. The weight of the tubular portion added to that of the valve member holds this seal, the center of gravity of the mass being below the flange 22. The position of the valve member and tube is best shown in Fig. 4 where gravity alone is acting upon the parts.

To actuate the valve member 25 to raise it from its air-tight seat on the plateau 23, a downwardly projecting member 30 is provided preferably integral with the closure member 19. The projecting member 30 is preferably concentric with the closure member and in turn with the recess 18, extending through the recess into the tubular portion 27 of the valve member to substantially the level of the electrolyte and may extend slightly below the terminus 27a of the tubular portion. The outside diameter of the projection 30 is slightly smaller than the inside diameter of the tubular portion 27, and may be made slightly tapering to conform to the tapering of the internal bore of the tubular portion. The relative dimension of the projection 30 and the tubular portion 27 must be such that ingress and egress of the projection 30 is readily accomplished without binding, so that the valve will not be withdrawn from the recess when the closure plug is removed for the filling operation, yet the dimension must be near enough to move the valve and tube to establish venting communication when the closure plug is in normal operative position shown in Fig. 5.

The venting communication for the normal operation of the battery which allows escape of gases from the space above the electrolyte is established by the cooperation between the tubular portion 27 and the projection 30, which conforms the axis of the tubular portion to substantially that of the closure plug and the recess and by doing so raises the valve member 25 against the force of gravity by a climbing action up the projection 30 active about a pivot point 31, formed by a cooperative relation between a portion of the perimeter of the valve member and a portion of the plateau 23. The portion of the perimeter of the valve member that performs this function is positioned above the portion of the tube displaced farthest from the axis of the recess as shown in Fig. 4. To make the manual manipulation of the closure plug 19 as smooth as possible, it is preferable to make the projection 30 a surface of revolution having its axis coincident with the axis of the threads in the recess and plug.

The cooperative relation between projection 30 on the closure plug 19 and the tubular portion 27 is established adjacent the lower terminus 27a of the tubular portion at a point on the tubular portion that is the least displaced from the axis of the recess 18, or that section of the tubular portion which is nearest to this axis as is most clearly shown in the plan view (Fig. 3). The length of the projection 30 is such that the aligning action by the projection to substantially coincide the axis of the tube with the axis of the recess 18 takes place before the cooperating threads on the plug and recess can be engaged. This is clearly shown in Fig. 1. The valve member will therefore remain in substantially the positions shown in Figs. 1 and 5 no matter what the relative relation between the threaded parts of the closure plug and recess may be, as long as sufficient engagement is retained to maintain the axis of the projection 30 substantially coincident with the axis of the recess 18. The valve member 25 will remain in open position to maintain venting communication for the battery until the closure plug 19 is removed from the recess 18. Thus the valve 25 cannot be closed by the action of vibration alone which would not be sufficient to move the closure plug upwardly against the binding of the threads and the action of gravity.

In Fig. 6 a modification of the valve member 25 is shown. The valve member is here provided with a conical upper surface 25a, having its highest point adjacent the central aperture 26, and sloping downwardly as it extends outwardly. The lower face of the valve member, which cooperates with the plateau 23 is substantially the same as before with the other details of construction also similar. The purpose of this conical surface is to deflect water outwardly during a filling operation to assure an air-tight seal between the valve and its seat by supplying water thereto.

In Figs. 7 and 8 another modification of a filling and venting device is shown, wherein the valve member is made separate from the depending tubular portion, which in this structure is made integral with the cover member. A boss 35 is again provided at a central location on a cover member 36, which in most respects is similar to that shown in Fig. 1. A recess 37 is formed in the boss, which communicates with the battery container by a filling aperture 37a further defined by a tubular depending member 38 preferably integral with the cover 36. A plateau 39 is formed on the floor around the filling aperture 37a preferably having a flat plane surface, being adapted to cooperate with a flat annular valve member 40, having a central aperture 41 substantially coincident with the filling aperture 37a to allow water to enter the container of the battery. The valve when under influence of only gravity lies flat upon the plateau 39 to form an air-tight seat therewith and adapted to cover at least two, preferably three uniformly spaced apertures 42 which pierce the plateau 39 at a point on the exterior of the tubular depending member 38 to place the upper portion of the battery container in communication with the recess 37. The depending tubular member 38 terminates in the desired level of the electrolyte, and controls the electrolyte level by trapping air in the upper portion of the battery container when the venting apertures 42 are closed by the valve member 40 as shown clearly in Fig. 7.

To lift the valve member 40 from its air-tight seat with the plateau 39 by which the apertures 42 are opened to vent the container for normal battery operation as shown in Fig. 8, a closure member 43 is provided having a threaded portion 44 to cooperate with a threaded portion 45 in the recess, whereby the closure member 43 is held in position for normal operation in the recess 37 by manual manipulation. A vent 46 is provided in the closure member 43 to establish communication for the recess 37 with the atmosphere. The valve member 40 is lifted through a cooperative relation between a depending integral projection 47 on the closure member 43, and a depending flange 48 rimming a portion of the aperture 41 of the valve member 40. The flange is strengthened by being a cylindrical section concentric with the aperture 41, and is given an oblique angular relation with reference to the plane of the valve member 40, which causes the lower terminus of the flange 48 to project inwardly toward the central axis of the tubular portion 38 and the axis of recess 37. An obliqueness of approximately 10° with the vertical axis is preferably given to the flange 48.

The flange 48 cooperates with the outer surface of the depending projection 47 which extends through the aperture 41 of the valve member 40. The outer surface is preferably a surface of revolution about the axis of the threads on the closure, which will give smoother operation during the time the closure plug is being attached by manual manipulation to the cover member 36. The projection 47 urges the lower terminus of the flange 48 outwardly to lift the valve 40 against gravity by moving it about a pivot 49 formed by a cooperative relation between a peripheral portion of the valve member 40, diametrically opposed to the position of the depending flange 48, and the plateau 39. The dimension of the projection 47 is such that the depending flange 48 may be retained loosely between the projection and the inner surface of the tubular portion 38 as shown in Fig. 8. A slight tapering form is preferably given to the projection 47 to aid in the lifting action on the valve.

With the parts of the filling and venting device as shown in Fig. 8, the path of movement of gasses being vented to the atmosphere is shown by arrows, this being the relation of the parts during the normal operation of the battery. The device illustrated in Figs. 7 and 8 has many of the advantages of the device illustrated in the other figures of the drawing disclosed in detail above.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation.

What is claimed is:

1. In a device of the class described, a battery enclosure having a cover with a filling aperture, a depending tubular portion cooperating with the cover to terminate at the predetermined electrolyte level in the battery enclosure, venting means external of the depending tubular portion to vent gases collected over the electrolyte level, a vented closure member for the filling aperture having a projection extending into the aperture when the closure member is attached to the cover, a valve member actuated by gravity cooperating with the filling aperture and the depending tubular portion to close the venting means and entrap air over the electrolyte after the electrolyte level reached the predetermined level as determined by the depending tubular portion, and a surface on the projection of the closure member cooperating with a portion of the valve member, said surface and said portion being obliquely disposed relative to each other in an initial position, whereby the valve member is caused to tilt by a lateral engagement when the closure member is in closed position to open the venting means.

2. In a chamber containing liquid and having a venting and filling opening formed in the cover thereof, tubular means having a flange at its upper end received in said opening and obliquely extending downwardly therefrom to predetermine the level of the liquid in the chamber, a portion of said cover around and defining said opening having a recess formed therein, said flange engaging with the portion of said cover by an air tight seat when under influence of gravity only, an upwardly directed boss outlining said recess associated with the upper surface of the cover, and a vented cap adapted to engage with said boss to cover said open and having a projection extending into and engaging a portion of said tubular means below the flange to tilt said tubular means to a vertical position and thereby break its air-tight seat on the cover.

3. In an electric storage battery box, a cover overlying the electrolyte in the box and having a filling opening, tubular means on the underside of the cover cooperating with the filling opening to provide a trapped-air space in the top of the box to determine the electrolyte level in the box, venting means for the trapped air space communicating with the filling opening, a vented closure member for the filling open allowing communication between the trapped-air space and the atmosphere when the closure member is in position over the filling opening, means for holding the closure member over the filling opening, a valve member having a vertically displaced portion cooperating with the closure member, the venting means and filling opening, adapted to be actuated by gravity when the closure member is removed from the filling opening to close the venting means to entrap air in the space in the top of the box above the terminus of the tubular means, and a depending projection on the closure member cooperating with the vertically displaced portion of the valve member, said projection and said portion being obliquely disposed relative to each other in an initial position, whereby the valve member is caused to tilt by a lateral engagement between the depending projection and the valve portion when the closure member is in closed position to open the venting means and give communication between the trapped air space and the atmosphere.

4. In a device of the class described in combination with a battery container having a filling aperture in its upper end, a threaded recess in the container formed around the aperture and provided with an inwardly extending flange on the lower end thereof, a gravity-actuated annular valve member with an obliquely depending tubular portion fitting as a unit into the recess to form an air-tight seal with the inwardly extending flange, the obliquely depending tubular portion extending below the flange to determine the level of the electrolyte when the seal is undisturbed, a threaded and vented closure member to fit into the recess by cooperating with its threads, and an elongated depending portion on the closure member to cooperate with the obliquely depending tubular portion of the valve member to align the tubular portion with the vertical axis of the closure member whereby the air-tight seal between the valve member and the flange is broken to vent the container to the atmosphere.

5. In a device of the class described, in combination with a battery enclosure having a filling aperture in its upper end, a recess formed in the enclosure partly defining the filling aperture, said recess having an inwardly extending flange on its lower end, a gravity-actuated annular valve member seated on the flange to form an air-tight seal therewith, an integral, obliquely depending tubular portion on the valve member to extend below the flange to determine the desired level of electrolyte in the enclosure, a vented closure member adapted to be fitted into the recess to close the filling aperture, an elongated depending cylinder on the closure member to extend loosely down into the oblique tubular member to substantially the level of the electrolyte when the closure member is in closed position, said cylinder aligning the oblique tubular portion with the axis of the recess to move the annular valve member to an oblique position to break the air-tight seal with the flange to thereby vent the enclosure to the atmosphere.

6. In a device of the class described in combination with a battery container having a filling aperture in its upper end, a recess in the container formed around the aperture and provided with an inwardly extending flange on its lower end, a gravity-actuated annular valve member of lesser diameter than the recess to cooperate with the flange to form an air-tight seat therewith, an obliquely depending tubular portion integral with the valve member to extend below the flange to determine the level of the electrolyte in the container when the air-tight relation between the valve member and the flange is undisturbed, a vented closure member adapted to be fitted into the recess by cooperating threads, and an elongated cylinder integral with closure member and depending therefrom along the vertical axis of the recess, said cylinder extending downwardly into the tubular portion of the valve member to substantially the level of the electrolyte to conform the axis of the tubular portion from an oblique relation to a coincident relation with respect to the vertical axis of the recess whereby the air-tight seat is disturbed by a resulting oblique relation between the flange and the valve member.

7. In a device of the class described in combination with a battery container having a filling aperture in its upper end, a recess formed in the container around the aperture and provided with an inwardly extending flange on its lower end, a gravity-actuated annular valve member cooperating with the flange to form an air-tight seat therewith, an integral, obliquely-depending tubular member on the valve member terminating at the desired level of electrolyte in the container, and a vented closure member threadedly cooperating with the recess, having a cylindrical depending portion to extend substantially through the tubular member when the closure member is in closed position, the cylindrical portion being of such dimension to align the axis of the tubular member with the axis of the recess before the closure member may be positioned in threaded relation in the recess.

8. In a device of the class described in combination with a battery container having a filling aperture in its upper end, a recess formed in the container defining the aperture in part and having an inwardly extending flange on its lower end, a depending tubular portion cooperating with the flange and adapted to extend downwardly therefrom to the desired level of electrolyte in the container, venting means external of the tubular portion communicating between the upper portion of the container and the recess, a gravity-actuated annular valve member positioned above the flange and adapted to cooperate therewith to form an air-tight seat, a depending portion on the valve member adapted to extend below the flange in an oblique direction with reference to the axis of the recess, a vented closure member for the filling aperture adapted to be positioned by threads in the recess, a depending portion on the closure member adapted to extend below the flange for cooperation with the depending portion of the valve member to align the depending portion of the valve member with the axis of the recess to raise the valve member in part for its air-tight seating with the flange whereby communication is established between the container and the atmosphere when the closure member is in closed position in the recess.

9. In a device of the class described, in combination, with a battery container having a recess in its upper end, an aperture in the floor of the recess for filling purposes, a vented closure member cooperating in threaded relation with the recess having a depending cylindrical portion extending downwardly therethrough a substantial distance into the battery container, means including at least one venting aperture cooperating with the floor of the recess to predetermine the level of the electrolyte in the container when the venting aperture is closed, and a gravity-actuated valve means adapted to embrace the depending cylindrical portion to close the venting aperture during a filling period, said valve means having an extension obliquely disposed with the depending portion of the closure member in an initial position and adapted to cooperate therewith below the floor of the recess to open the venting aperture by tilting the valve means by a lateral thrust when the closure member is positioned in the recess.

10. In a device of the class described, in combination, with a battery container having a recess in its upper end, an aperture in the floor of the recess for filling purposes, a vented closure member cooperating in a threaded relation with the recess having a depending portion comprising a surface of revolution extending downwardly therethrough and into the battery container a substantial distance below the floor, means including at least one venting aperture cooperating with the floor of the recess to predetermine the level of the electrolyte in the container when the venting aperture is closed, and a gravity-actuated valve means positioned in the recess to close the venting aperture during a filling period, said valve means having an extension into the battery extending obliquely toward the depending portion being adapted to cooperate with the depending portion of the closure member to open the venting aperture before the closure member is in alignment with the recess and capable of being threaded into position in the recess.

11. In a device of the class described, in combination, with a battery container having a recess in its upper end, an aperture in the floor of the recess for filling purposes, a vented closure member cooperating in threaded relation with the recess having a depending portion extending downwardly through the recess and through the aperture in the floor of the recess to substantially the level of the electrolyte in the container, means including at least one closable venting path cooperating with the floor of the recess to predetermine the level of the electrolyte in the container when the venting path is closed, and a gravity-actuated valve means in the recess to close the venting path during a filling operation, said valve means being adapted to embrace the depending portion of the closure member and having an oblique extension to engage the depending portion and establishing a cooperative actuating relation therewith beneath the floor of the recess when the closure member is in position with relation to the recess whereby the valve member is actuated to open the venting path.

12. In a chamber for containing liquid provided with a cover having a filling and venting opening therethrough, said opening provided with a seat intermediate its length, a ring-shaped plate nesting on said seat by gravity when the opening is unobstructed, said plate having an extension therefrom toward the chamber interior and from adjacent the plate perimeter obliquely toward a perpendicular center line extending through said plate, the plate and seat when in nesting relation cooperating to cause any liquid poured through the opening into the chamber to pass through such plate and the extension, a vented closure for the opening having a projection extending toward the chamber interior and when in position over said opening said projection extending through the plate and cooperating with the plate extension to hold said plate in a tilted position as to the seat and whereby gases escaping from the chamber interior through the opening and vented closure may flow through and around said plate.

13. In an electric storage battery, a container, a cover therefor having an aperture, a tubular extension from said cover in communication with said aperture, said aperture and tubular extension providing an opening into said container with the tubular portion having its lower end determining the maximum desired height of electrolyte to be introduced into said battery, a seat intermediate the opening length, a port communicating between said seat and the container interior, a plate resting by gravity on said seat to close said port during battery filling whereby all liquid poured into said aperture will pass through the opening, a flange on said plate within the opening extending downwardly and inwardly therefrom toward the container interior, and a vented closure for the opening having a projection therefrom toward the container interior and when in position to close the aperture, said projection engaging said flange to hold said plate in a tilted position as to the seat to thereby open said port to permit gas flow from the container interior therethrough and thence through the vented closure to atmosphere.

HARLAND D. WILSON.